(12) United States Patent
Kim et al.

(10) Patent No.: US 7,140,254 B2
(45) Date of Patent: Nov. 28, 2006

(54) APPARATUS FOR GENERATING AND MEASURING BENDING VIBRATION IN A NON-FERROMAGNETIC PIPE WITHOUT PHYSICAL CONTACT

(75) Inventors: Yoon Young Kim, Seoul (KR); Soon Woo Han, Seoul (KR); Chan Park, II, Gyeonggi-do (KR)

(73) Assignee: Seoul National University Foundation, Seoul (KR)

( * ) Notice: Subject to any disclaimer, the term of this patent is extended or adjusted under 35 U.S.C. 154(b) by 0 days.

(21) Appl. No.: 11/002,230

(22) Filed: Dec. 3, 2004

(65) Prior Publication Data

US 2005/0223801 A1    Oct. 13, 2005

(30) Foreign Application Priority Data

Apr. 7, 2004    (KR) .................. 10-2004-0023851

(51) Int. Cl.
*G01N 24/12*    (2006.01)
*G01N 27/00*    (2006.01)

(52) U.S. Cl. ................. 73/643; 73/576; 324/219

(58) Field of Classification Search ................. 73/643, 73/622, 598, 620, 576, 577, 779, 812; 376/249, 376/252; 324/219
See application file for complete search history.

(56) References Cited

U.S. PATENT DOCUMENTS 3,555,887 A * 1/1971 Wood ................ 73/643
4,950,988 A * 8/1990 Garshelis ................ 324/207.24
5,821,430 A * 10/1998 Kwun et al. .............. 73/862.41
5,828,214 A * 10/1998 Taicher et al. .............. 324/303
6,164,137 A * 12/2000 Hancock et al. .............. 73/643
6,429,650 B1    8/2002 Kwun et al.
6,561,035 B1 * 5/2003 Passarelli, Jr. ............... 73/643
6,920,792 B1 * 7/2005 Flora et al. .................. 73/622
6,951,133 B1 * 10/2005 Passarelli, Jr. ............... 73/643
2004/0045373 A1    3/2004 Kwun et al.
2006/0027022 A1 * 2/2006 Flora et al. .................. 73/627

* cited by examiner

*Primary Examiner*—Hezron Williams
*Assistant Examiner*—Jacques Saint-Surin
(74) *Attorney, Agent, or Firm*—Dickstein Shapiro LLP

(57) ABSTRACT

An apparatus for generating and measuring bending vibration in a pipe buried underground or a pipe covered by insulating materials is disclosed. There is provided an apparatus for generating and measuring bending vibration in a non-ferromagnetic pipe without physical contact, comprising: a ferromagnetic strip adhered on a surface of the pipe; a coil wound around the surface of the pipe; two magnets for generating bias magnetic field, applied to the strip and parallel to the strip; a power source for supplying an electric current to the coil; and a measuring unit for measuring variation of voltage across the coil, the variation of the voltage being generated due to a strain according to inverse magnetostrictive effect, the strain being generated due to bending vibration, the bending vibration being generated due to deformation of the strip, the deformation being induced according to magnetostrictive effect as the power source supplies the electric current to the coil.

2 Claims, 3 Drawing Sheets

APPARATUS FOR GENERATING AND MEASURING BENDING VIBRATION IN A NON-FERROMAGNETIC PIPE WITHOUT PHYSICAL CONTACT

CROSS-REFERENCE TO RELATED APPLICATIONS

The entire disclosure of Korean Patent Application No. 10-2004-0023851 filed on Apr. 7, 2004 including specification, claims, drawings and summary, is incorporated herein by reference in its entirety.

BACKGROUND OF THE INVENTION

1. Field of the Invention

The present invention relates to a non-destructive testing apparatus for a pipe. More particularly, the present invention relates to an apparatus for generating and measuring bending vibration in a non-ferromagnetic pipe without physical contact, which may generate and measure bending vibration in a pipe buried underground or a pipe covered by insulating materials.

2. Description of the Related Art

Pipes are frequently buried underground or covered by insulating materials, coating materials, etc. In the related art, it is possible to measure bending vibration and to perform safety inspection in the pipes only after the pipes are uncovered by digging the ground or by peeling the insulating materials, the coating materials, etc.

However, there is a drawback in the related art that it needs long time and great cost for both a test and recovery after the test. Thus, it requires development of an apparatus for detecting structural defects of pipes without digging the ground or peeling the insulating materials, the coating materials, etc.

Magnetostrictive effect, which is also called Joule effect, refers to a phenomenon that mechanical deformation occurs in a ferromagnetic material when the ferromagnetic material is placed in magnetic fields. A reciprocal phenomenon of the magnetostrictive effect (i.e. a phenomenon that changes in magnetic field in vicinity of materials occur when mechanical stress is applied to the materials) is designated as inverse magnetostrictive effect or Villari effect.

The magnetostrictive effect can be expressed as follows.

When ferromagnetic materials are placed in magnetic field H, induced magnetic flux density B inside the ferromagnetic materials is the sum of magnetic flux density in vacuum and magnetic flux density induced by magnetization of the ferromagnetic materials. Therefore, the magnetic flux density B inside the ferromagnetic materials can be expressed as equation 1.

$$B = \mu_0 H + \mu_0 M = \mu_0 H + \mu_0 \chi_m H = \mu_0 (1 + \chi_m) H = \mu_0 \mu_r H = \mu H \quad \text{[Equation 1]}$$

where B denotes magnetic flux density, H denotes magnetic field intensity applied by an outside magnet or electromagnet, M denotes magnetization, $\chi_m$ denotes magnetic susceptibility, $\mu_0$ denotes permeability of free space, $\mu_r$ denotes relative permeability, and $\mu$ denotes permeability.

The Joule effect and Villari effect can be expressed as equations 2 and 3.

$$\varepsilon = \frac{\sigma}{E^H} + q^* H \quad \text{[Equation 2]}$$

$$B = \mu^\sigma H + q\sigma \quad \text{[Equation 3]}$$

where $\varepsilon$ denotes strain, $\sigma$ denotes stress applied to the ferromagnetic material, $E^H$ denotes modulus of elasticity in a constant magnetic field and $\mu^\sigma$ denotes permeability when constant stress is applied.

The coefficients q* and q in equations 2 and 3 representing the Joule effect and Villari effect can be represented as equations 4 and 5, respectively.

$$q^* = \left.\frac{d\varepsilon}{dH}\right)_\sigma \quad \text{[Equation 4]}$$

$$q = \left.\frac{dB}{d\sigma}\right)_H \quad \text{[Equation 5]}$$

If an apparatus for generating and measuring bending vibration use magnetostrictive effect or inverse magnetostrictive effect mentioned above, the apparatus for generating and measuring bending vibration can measure deformation of testing member without any physical contacts with the testing member by applying magnetic field to the testing member and by measuring variation of the magnetic field according to the inverse magnetostrictive effect. Thus, the apparatus for generating and measuring bending vibration can be applied to various testing members inaccessible or difficult to access.

BRIEF SUMMARY OF THE INVENTION

Accordingly, the present invention has been made to solve the above-mentioned problems occurring in the related art, and an object of the present invention is to provide an apparatus for generating and measuring bending vibration in a pipe which may generate and measure bending vibration in a covered pipe without any physical contacts with the pipe (e.g. without removing insulating materials that covers the pipe).

In order to accomplish these objects, there is provided an apparatus for generating and measuring bending vibration in a non-ferromagnetic pipe without physical contact, comprising: a ferromagnetic strip adhered on a surface of the non-magnetic pipe; a coil wound around the surface of the non-magnetic pipe, the coil being apart from the surface of the non-ferromagnetic pipe; two magnets for generating bias magnetic field, applied to the ferromagnetic strip and parallel to the ferromagnetic strip, the magnets being apart from each other, the magnets being apart from the coil; a power source for supplying an electric current to the coil; and a measuring unit for measuring variation of voltage across the coil, the variation of the voltage being generated due to a strain applied to the ferromagnetic strip according to inverse magnetostrictive effect, the strain being generated due to bending vibration in the non-ferromagnetic pipe, the bending vibration being generated due to deformation of the ferromagnetic strip, the deformation of the ferromagnetic strip being induced according to magnetostrictive effect as the power source supplies the electric current to the coil.

Preferably, the measuring unit comprises: a power amplifier for amplifying signal of the variation of the voltage across the coil; an oscilloscope for receiving the amplified signal from the power amplifier and displaying the amplified signal according to lapse of time; and a computer for receiving data regarding the variation of the signal in shape of digital signal from the oscilloscope and processing the data.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Hereinafter, a preferred embodiment of the present invention will be described with reference to the accompanying drawings.

Figure 1:
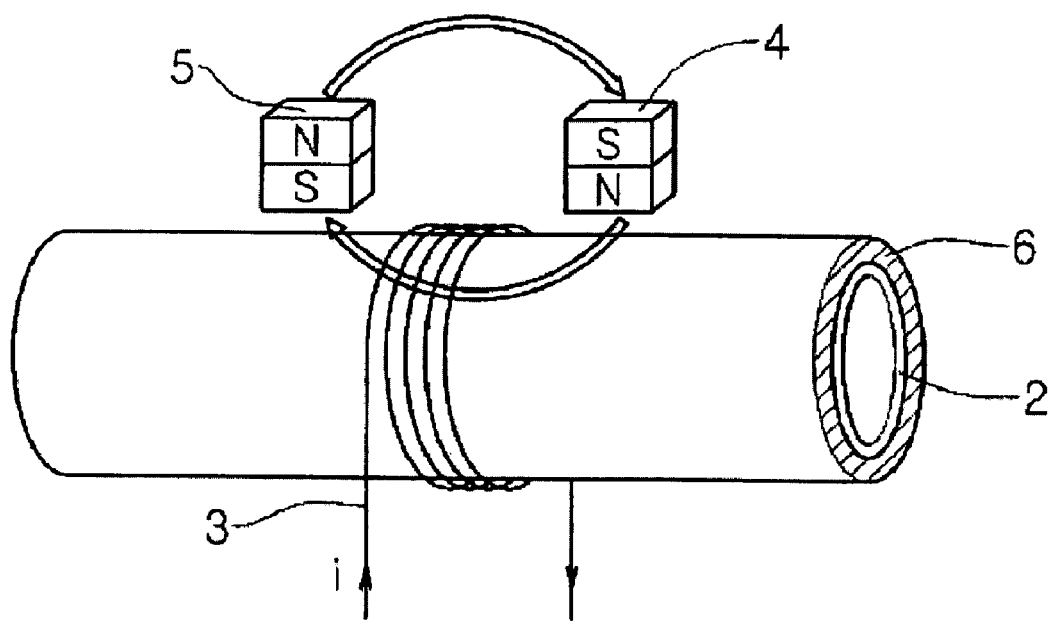
FIG. 1 illustrates a configuration of an apparatus for generating and measuring bending vibration in a non-ferromagnetic pipe without physical contact according to the present invention.
Figure 2:
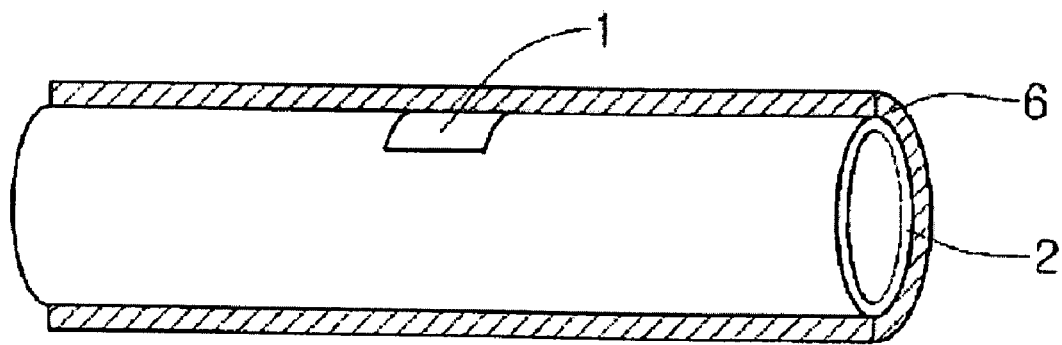
FIG. 2 is a cross-sectional view illustrating that ferromagnetic strip is adhered on the non-ferromagnetic pipe illustrated in FIG. 1.

FIG. 1 illustrates a configuration of an apparatus for generating and measuring bending vibration in a non-ferromagnetic pipe without physical contact according to the present invention. FIG. 2 is a cross-sectional view illustrating that ferromagnetic strip is adhered on the non-magnetic pipe illustrated in FIG. 1.

As illustrated in FIGS. 1 and 2, the apparatus for generating and measuring bending vibration without physical contact according to the present invention comprises: a ferromagnetic strip 1 adhered on a surface of pipe 2, a coil 3 wound around the pipe 2 and two bias magnets 4 and 5 to generate magnetic fields, applied to the strip 1 and parallel to the strip 1, the two bias magnets being apart from each other.

Strip 1 can be made of ferromagnetic materials such as Iron, Nickel, Cobalt and so on and, particularly, soft magnetic materials like Nickel is desirable as materials for the strip since they are quickly recovered to the initial state after magnetic field is removed, according to their features of rapid increase in magnetization curve and small hysteresis. By using such soft magnetic materials, it is possible to apply magnetostrictive effect to a non-ferromagnetic pipe.

A first magnet of the two bias magnets puts N pole down and a second magnet of the two bias magnets puts S pole down, in order to generate magnetic field, parallel to the strip and applied to the strip without physical contact with the strip.

Figure 3:
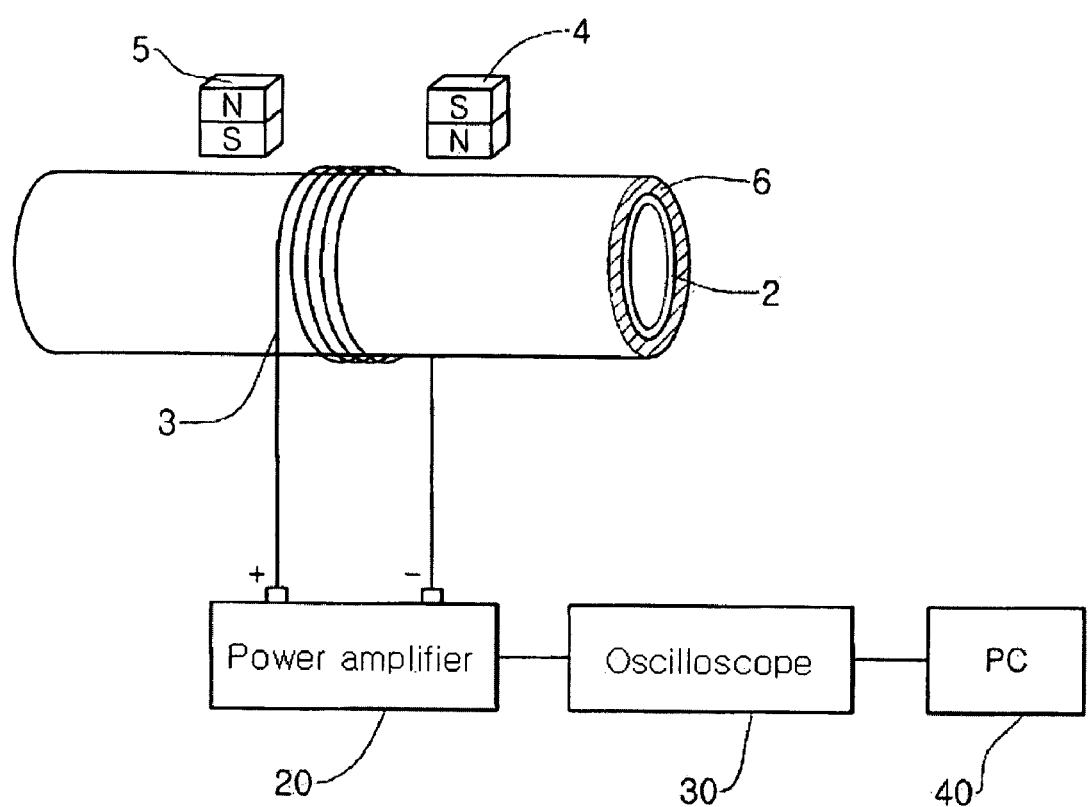
FIG. 3 illustrates a configuration of entire system for generating and measuring bending vibration in a non-ferromagnetic pipe without physical contact according to a preferred embodiment of the present invention.

FIG. 3 illustrates a configuration of entire system for generating and measuring bending vibration in a non-ferromagnetic pipe without physical contact according to a preferred embodiment of the present invention.

As illustrated in FIG. 3, the system using the apparatus for generating and measuring bending vibration in a non-ferromagnetic pipe without physical contact according to the present invention comprises: a power amplifier 20 for supplying currents to a coil 3 and measuring signal of variation of voltage across the coil; an oscilloscope 30 for displaying the amplified signal according to lapse of time and converting the amplified signal into digital data; and a computer for receiving the digital data from the oscilloscope and processing the digital data.

The apparatus for generating and measuring bending vibration in a non-ferromagnetic pipe without physical contact is suited for testing non-ferromagnetic pipes covered by the insulating materials, etc. as illustrated in FIGS. 1 to 3. As illustrated in FIG. 2, the ferromagnetic strip 1 is adhered on the pipe and, then, necessary insulating material or coating material is provided. The pipe is used after winding the coil around the pipe covered by the insulating material or the coating material. When the pipe needs to be checked for maintenance according to standards after using for a while, the system illustrated in FIG. 3 is installed around the ferromagnetic strip adhered on the pipe. Thereafter, electric current supplied to the coil 3 by the power amplifier 20 deforms the ferromagnetic strip according to magnetostrictive effect. Due to the deformation of the ferromagnetic strip, bending elastic waves are generated, thus, to transmit bending vibration to the pipe.

The bending vibration deforms the ferromagnetic strip and, then, variation of magnetic field generated by the two magnets and the coil occurs. Such variation of magnetic field is displayed in the oscilloscope 30.

Figure 4:
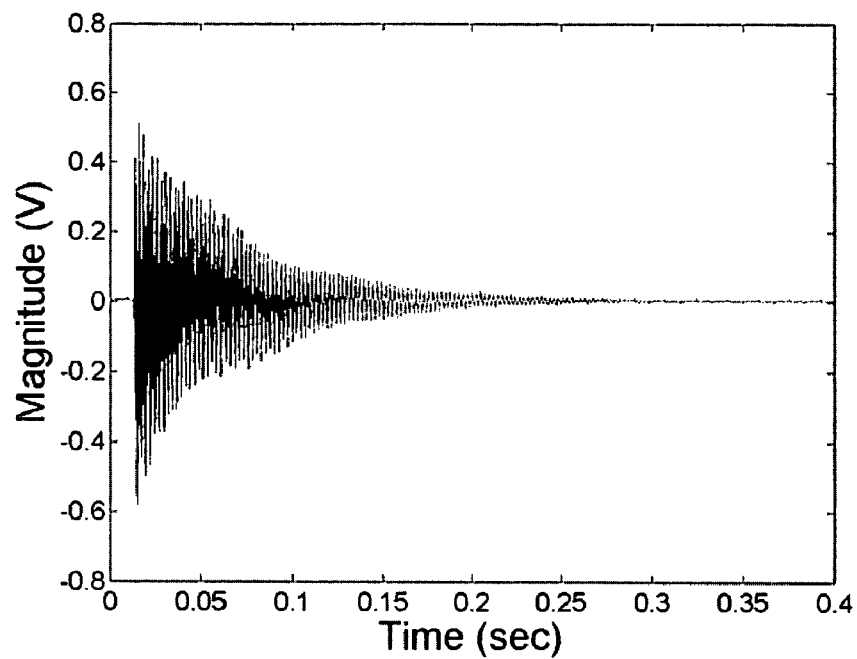
FIG. 4 is a graph illustrating bending vibration measured in a non-ferromagnetic pipe according to a preferred embodiment of the present invention.
Figure 5:
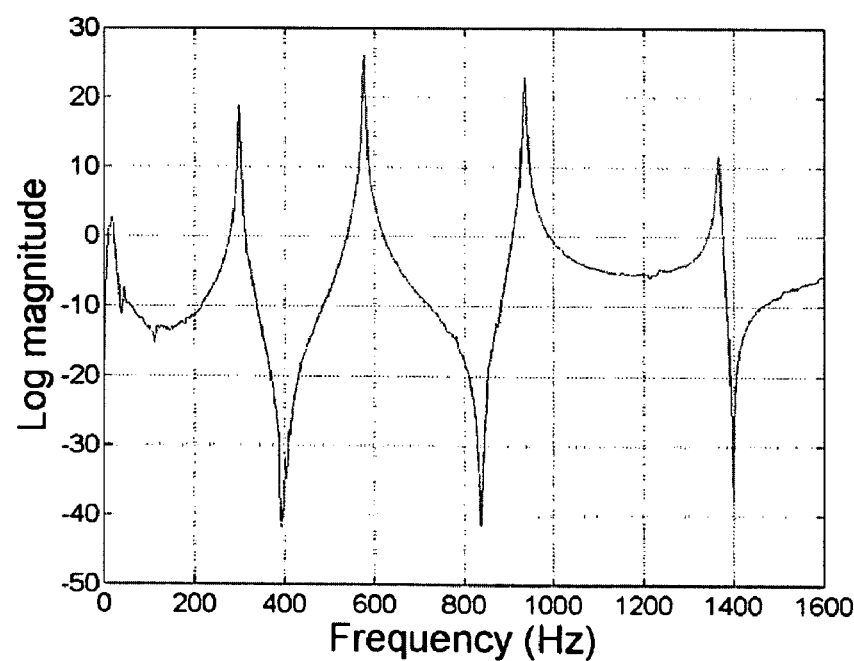
FIG. 5 is a graph of frequency response made by measuring bending vibration according to a preferred embodiment of the present invention.

FIG. 4 is a graph illustrating bending vibration measured in a non-ferromagnetic pipe according to a preferred embodiment of the present invention. FIG. 5 is a graph of frequency response made by measuring bending vibration according to a preferred embodiment of the present invention.

The computer processes measured data illustrated in FIGS. 4 and 5 by receiving the data as digital data, so that it is possible to measure the generated bending vibration quantitatively.

As described above, according to the present invention, it is possible to stably generate and measure bending vibration in a pipe made of non-ferromagnetic material such as aluminum by using magnetostrictive effect and inverse magnetostrictive effect.

Although preferred embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. An apparatus for generating and measuring bending vibration in a non-ferromagnetic pipe without physical contact, comprising:

a ferromagnetic strip adhered on a surface of the non-magnetic pipe;

a coil wound around the surface of the non-magnetic pipe, the coil being apart from the surface of the non-magnetic pipe;

two magnets for generating bias magnetic field, applied to the ferromagnetic strip and parallel to the ferromagnetic strip, the magnets being apart from each other, the magnets being apart from the coil;

a power source for supplying an electric current to the coil; and a measuring unit for measuring variation of voltage across the coil, the variation of the voltage being generated due to a strain applied to the ferromagnetic strip according to inverse magnetostrictive effect, the strain being generated due to bending vibration in the non-ferromagnetic pipe, the bending vibration being generated due to deformation of the ferromagnetic strip, the deformation of the ferromagnetic strip being induced according to magnetostrictive effect as the power source supplies the electric current to the coil.

2. The apparatus according to claim 1, wherein the measuring unit comprises:

a power amplifier for amplifying signal of the variation of the voltage across the coil;

an oscilloscope for receiving the amplified signal from the power amplifier and displaying the amplified signal according to lapse of time; and a computer for receiving data regarding the variation of the signal in shape of digital signal from the oscilloscope and processing the data.

* * * * *